United States Patent
Jung et al.

(10) Patent No.: US 10,863,166 B2
(45) Date of Patent: Dec. 8, 2020

(54) METHOD AND APPARATUS FOR GENERATING THREE-DIMENSIONAL (3D) ROAD MODEL

(71) Applicant: SAMSUNG ELECTRONICS CO., LTD., Suwon-si (KR)

(72) Inventors: Hwiryong Jung, Seoul (KR); Young Hun Sung, Hwaseong-si (KR); KeeChang Lee, Seongnam-si (KR); Kyungboo Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 15/452,476

(22) Filed: Mar. 7, 2017

(65) Prior Publication Data
US 2018/0131924 A1 May 10, 2018

(30) Foreign Application Priority Data
Nov. 7, 2016 (KR) .................. 10-2016-0147323

(51) Int. Cl.
| | |
|---|---|
| *H04N 13/271* | (2018.01) |
| *H04N 13/254* | (2018.01) |
| *G01C 21/32* | (2006.01) |
| *H04N 13/204* | (2018.01) |
| *H04N 13/257* | (2018.01) |
| *G01C 21/28* | (2006.01) |
| *G01C 21/36* | (2006.01) |
| *G06K 9/00* | (2006.01) |
| *H04N 13/00* | (2018.01) |

(52) U.S. Cl.
CPC .......... *H04N 13/271* (2018.05); *G01C 21/28* (2013.01); *G01C 21/32* (2013.01); *G01C 21/3602* (2013.01); *G06K 9/00798* (2013.01); *H04N 13/204* (2018.05); *H04N 13/254* (2018.05); *H04N 13/257* (2018.05); *H04N 2013/0077* (2013.01); *H04N 2013/0081* (2013.01)

(58) Field of Classification Search
None
See application file for complete search history.

(56) References Cited

U.S. PATENT DOCUMENTS

| | | | |
|---|---|---|---|
| 7,363,133 | B2 | 4/2008 | Maurer et al. |
| 9,275,287 | B2 | 3/2016 | Watanabe et al. |
| 2013/0141520 | A1* | 6/2013 | Zhang .................. H04N 7/18 348/36 |
| 2015/0367781 | A1* | 12/2015 | Takemae et al. |

(Continued)

FOREIGN PATENT DOCUMENTS

| | | |
|---|---|---|
| JP | 2008-128827 A | 6/2008 |
| JP | 5346650 B2 | 8/2013 |

(Continued)

*Primary Examiner* — Leon Viet Q Nguyen
(74) *Attorney, Agent, or Firm* — NSIP Law

(57) ABSTRACT

A method for generating a three-dimensional (3D) lane model, the method including calculating a free space indicating a driving-allowed area based on a driving image captured from a vehicle camera, generating a dominant plane indicating plane information of a road based on either or both of depth information of the free space and a depth map corresponding to a front of the vehicle, and generating a 3D short-distance road model based on the dominant plane.

21 Claims, 9 Drawing Sheets

(56) References Cited

U.S. PATENT DOCUMENTS

| | | | |
|---|---|---|---|
| 2016/0325753 A1* | 11/2016 | Stein | G06K 9/46 |
| 2017/0039438 A1* | 2/2017 | Homma | G06K 9/00805 |
| 2017/0277197 A1* | 9/2017 | Liao et al. | |
| 2019/0294893 A9* | 9/2019 | Berberian | G06K 9/00805 |

FOREIGN PATENT DOCUMENTS

| | | |
|---|---|---|
| JP | 2015-197707 A | 11/2015 |
| JP | 5906988 B2 | 4/2016 |
| KR | 10-1359660 B1 | 2/2014 |
| KR | 10-2015-0144681 A | 12/2015 |

* cited by examiner

FIG. 1
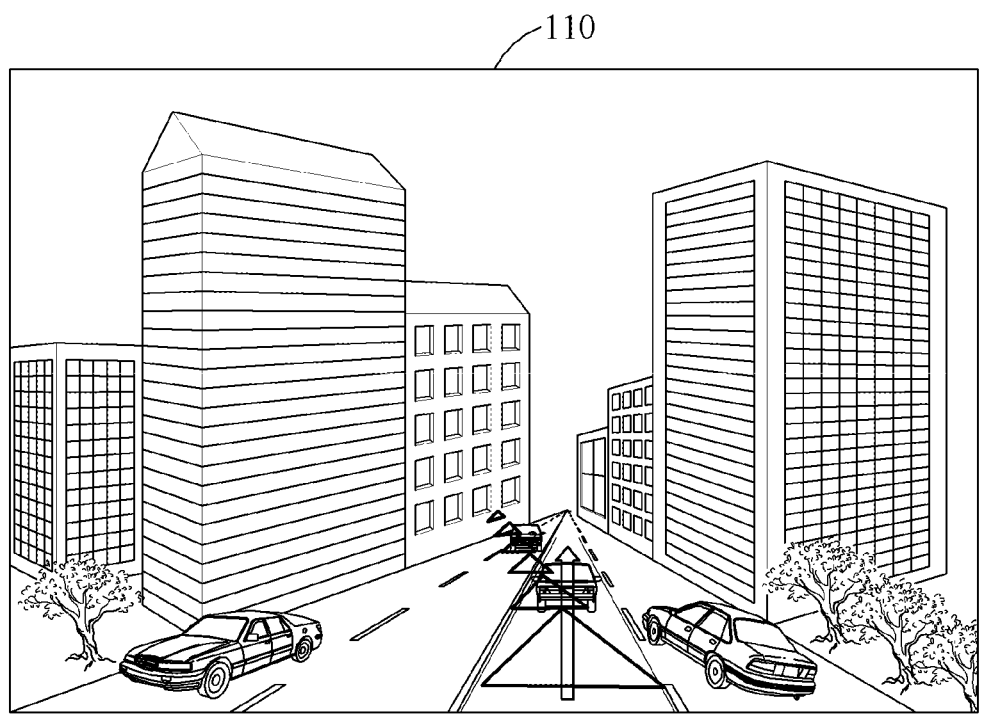
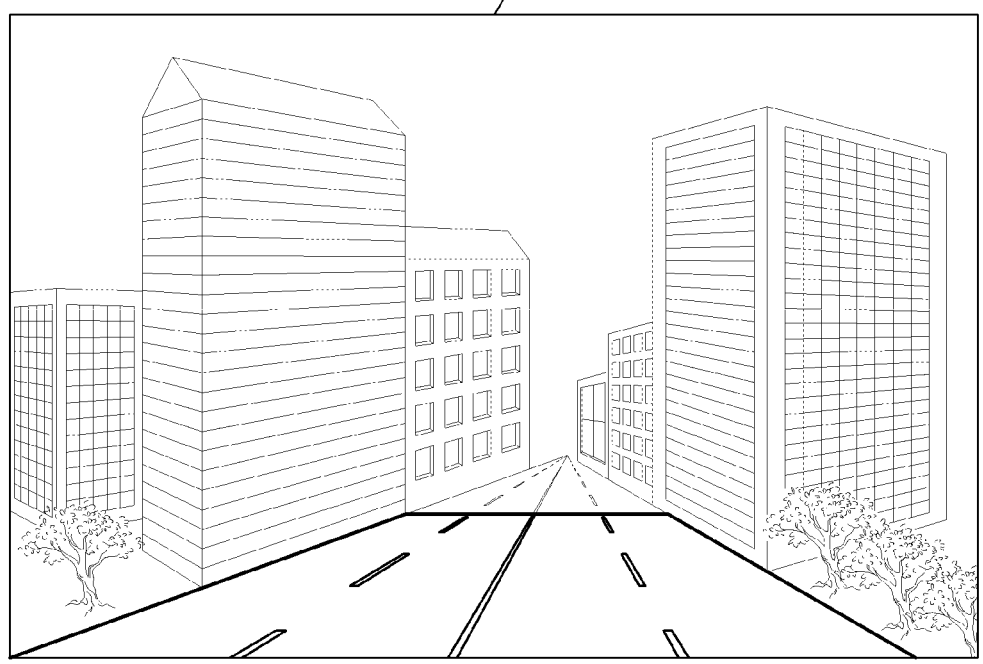

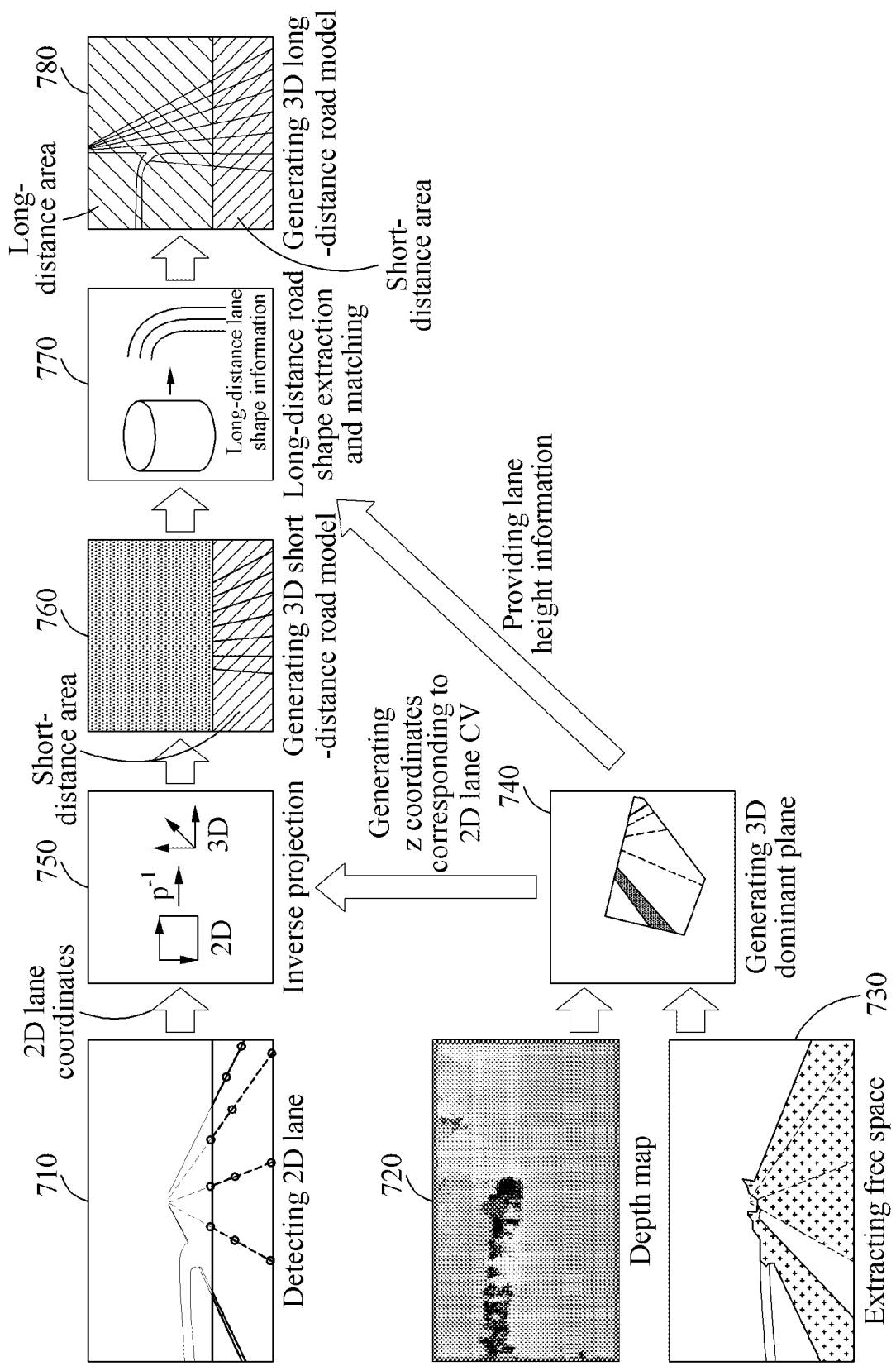

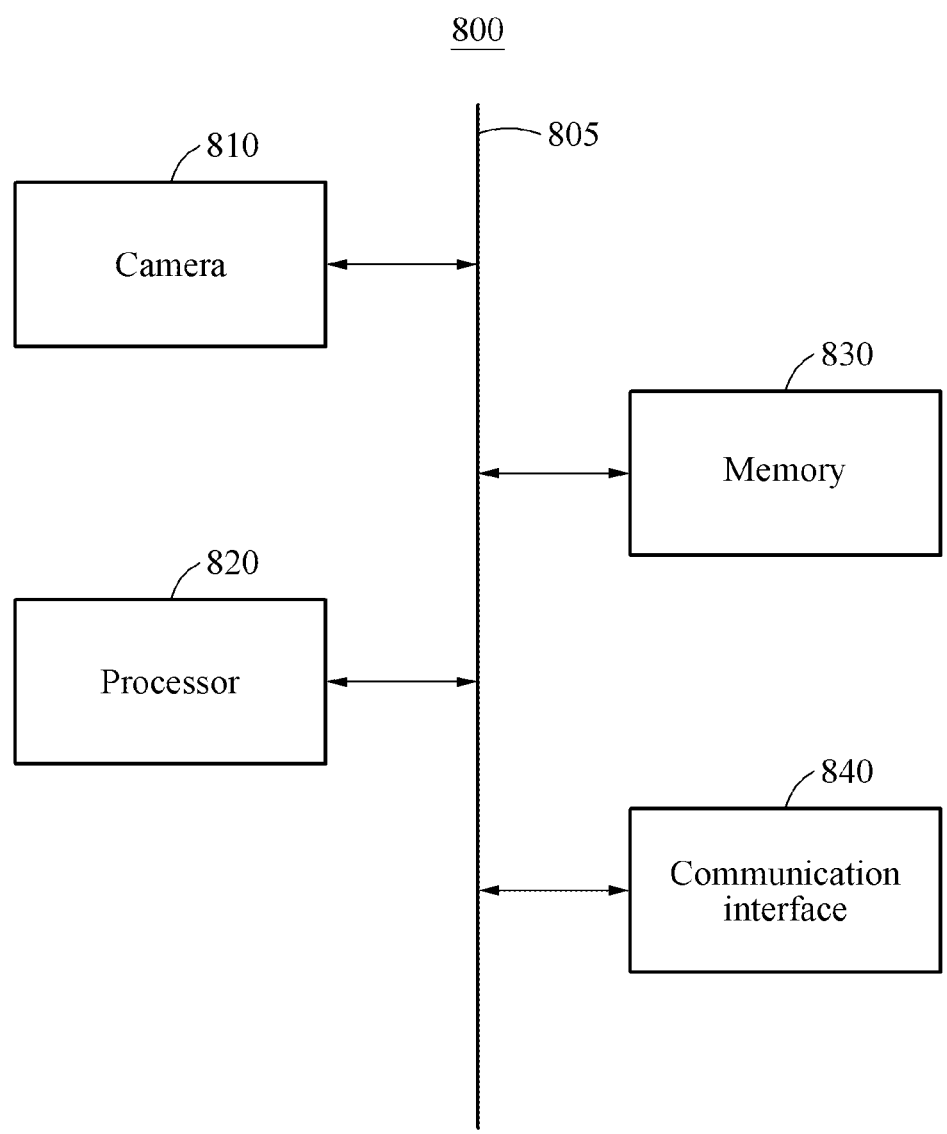

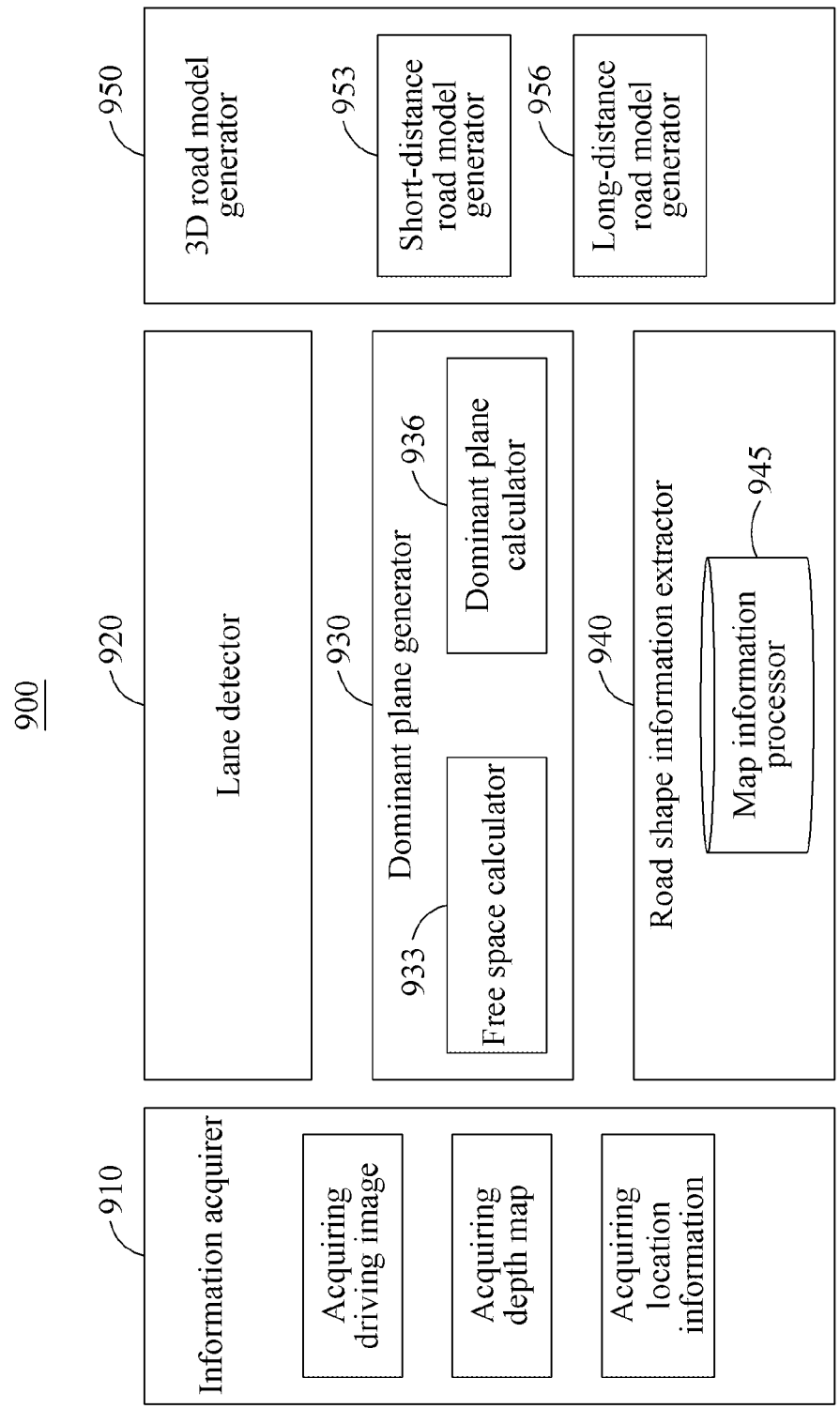

METHOD AND APPARATUS FOR GENERATING THREE-DIMENSIONAL (3D) ROAD MODEL

CROSS-REFERENCE TO RELATED APPLICATION(S)

This application claims the benefit under 35 USC § 119(a) of Korean Patent Application No. 10-2016-0147323 filed on Nov. 7, 2016, in the Korean Intellectual Property Office, the entire disclosure of which is incorporated herein by reference for all purposes.

BACKGROUND

1. Field

The following description relates to a method and apparatus for generating a three-dimensional (3D) road model.

2. Description of Related Art

Navigation technology represents known route information on a two-dimensional (2D) map or a three-dimensional (3D) map generated in advance and thus, heretofore has not generally provided a real-time generation of a long-distance spatial model. Lane detection technology detects, for example, white, yellow, and blue lane markings from a 2D image captured by a camera and thus, does not generate a 3D road model. Also, a long-distance area converging to a vanishing point in a camera image may not have information due to a limitation of the lane detection technology.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of generating a three-dimensional (3D) lane model, includes calculating a free space indicating a driving-allowed area based on a driving image captured from a vehicle camera, generating a dominant plane indicating plane information of a road based on either one or both of depth information of the free space and a depth map corresponding to a front of the vehicle, and generating a 3D short-distance road model based on the dominant plane.

The calculating of the free space may include acquiring the driving image from a camera included in the vehicle, generating the depth map including depth information corresponding to a visual field criterion of the front of the vehicle, and calculating the free space based on the driving image and the depth map. The driving image from the camera included in the vehicle may be acquired while driving.

The acquiring of the driving image may include acquiring the driving image including at least one of camera information, a black-and-white image, or a color image captured by the camera.

The generating of the depth map may include acquiring the depth information using at least one of a radar, a lidar, or a stereo matching method using a stereo camera.

The method may further include extracting road shape information including a surface of the road, a lane marking on the road, and a center line of the road from the driving image.

The generating of the 3D short-distance road model may include generating 3D coordinates based on two-dimensional (2D) coordinates of vertices configuring the lane marking and depth information corresponding to the 2D coordinates of the vertices on the dominant plane, generating 3D lane information by performing inverse projection on the generated 3D coordinates, and generating the 3D short-distance road model based on the 3D lane information.

The extracting of the road shape information may include acquiring location information including at least one of current location information of the vehicle or direction information of the vehicle, and extracting the road shape information currently viewed by the camera based on the location information and camera information included in the driving image.

The acquiring of the location information may include acquiring the location information using at least one of a global positioning system (GPS), an inertial measurement unit (IMU), or a visual odometry method.

The acquiring of the location information may include acquiring travel route information based on a starting point and a destination of the vehicle from map information, and acquiring location information including at least one of current location information of the vehicle or direction information of the vehicle based on the travel route information.

The extracting of the road shape information may include extracting road shape information entering a viewing frustum of the camera from the map information based on the location information and the camera information included in the driving image.

The method may further include generating a 3D long-distance road model based on the road shape information and the 3D short-distance road model.

The generating of the 3D long-distance road model may include matching the road shape information and the 3D short-distance road model, and projecting a matching result onto the dominant plane and generating the 3D long-distance road model.

The matching may include matching the road shape information and the 3D short-distance road model using a least square method (LSM).

The generating of the 3D long-distance road model may include acquiring height information from the dominant plane, and generating the 3D long-distance road model based on the height information, the road shape information, and the 3D short-distance road model.

In another general aspect, an apparatus for generating a 3D road model includes a camera configured to capture a driving image from a vehicle camera, and a processor configured to calculate a free space indicating a driving-allowed area based on the driving image, generate a dominant plane indicating plane information of a road based on at least one of depth information of the free space and a depth map corresponding to a front of the vehicle, and generate a 3D short-distance road model based on the dominant plane.

The processor may be configured to acquire the driving image from a camera included in the vehicle, generate the depth map including depth information corresponding to a visual field criterion of the front of the vehicle, and calculate the free space based on the driving image and the depth map.

The processor may be configured to extract road shape information including a surface of the road, a lane marking on the road, and a center line of the road from the driving image, generate 3D coordinates based on 2D coordinates of vertices configuring the lane marking and depth information corresponding to the 2D coordinates of the vertices on the dominant plane, and generate the 3D short-distance road model based on 3D lane information generated by performing inverse projection on the generated 3D coordinates.

The apparatus may further include a memory configured to store map information, and the processor may be configured to acquire location information including at least one of current location information of the vehicle or direction information of the vehicle based on travel route information generated using a starting point and a destination of the vehicle from the map information stored in the memory, and extract road shape information entering a viewing frustum of the camera from the map information based on the location information and the camera information included in the driving image.

The processor may be configured to match the road shape information and the 3D short-distance road model and project a matching result onto the dominant plane and generating the 3D long-distance road model.

Other features and aspects will be apparent from the following detailed description, the drawings, and the claims.

BRIEF DESCRIPTION OF THE DRAWINGS

FIG. 1 illustrates an example of an augmented reality navigation system in which a method of generating a three-dimensional (3D) road model is performed.

FIG. 7 illustrates an example of generating a 3D road model.

FIG. 8 illustrates an apparatus for generating a 3D road model.

FIG. 9 illustrates an example of a processor in an apparatus for generating a 3D lane model.

Figure 2:
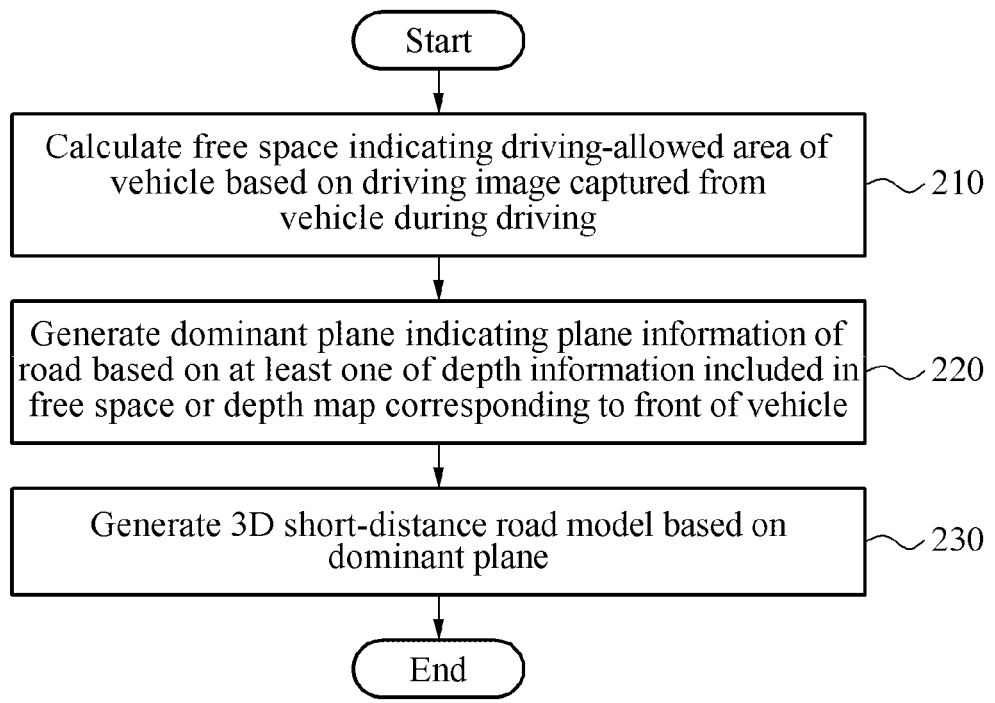
FIG. 2 illustrates an example of a method of generating a 3D road model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining an understanding of the disclosure of this application. For example, the sequences of operations described herein are merely examples, and are not limited to those set forth herein, but may be changed as will be apparent to one of ordinary skill in the art, with the exception of operations necessarily occurring in a certain order. Also, descriptions of features, functions, and constructions that are well known to one of ordinary skill in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after gaining a thorough understanding of the disclosure of this application.

Terms such as first, second, A, B, (a), (b), and the like may be used herein to describe components or features. Each of these terminologies is not used to define an essence, order or sequence of a corresponding component but used merely to distinguish the corresponding component from other component(s). For example, a first component may be referred to as second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be shown as directly connected, coupled or joined to the second component. However, it should be noted that if it is described in the specification that one component is "directly connected" or "directly joined" to another component, a third component is not present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

One or more embodiments generate a three-dimensional (3D) road model in an augmented reality navigation system. One or more embodiments provide a road space model, for example, a road surface, a lane, and a center line in a long distance of at least 100 meters (m) to provide accurate route information to a user. One or more of the embodiments are applicable to, for example, a mobile device, a smartphone, an intelligent automobile, and an autonomous driving vehicle. Hereinafter, embodiments will be described with reference to the accompanying drawings.

FIG. 1 illustrates an example of an augmented reality navigation system in which a method of generating a 3D road model is performed. FIG. 1 illustrates a view 110 in which an actual road is not matched to a guided driving route and a view 130 in which a long-distance area is inaccurately presented in the augmented reality navigation system.

In general navigation technology, known route information is represented on two-dimensional (2D) map, or other such maps, which may be only be rough approximations generated in advance, and an augmented reality (AR) object is not presented in a real image. For this reason, a long-distance space model has, heretofore, generally not been applied in the general navigation technology. In contrast, the augmented reality navigation system dynamically generates a space model associated with a road to provide accurate route information to a user. The space model includes, for example, a road surface, a lane, and a center line of a road. When an accurate matching between an actual road image and a modeled road model is not performed in the augmented reality navigation system, matching between the actual road and the guided driving route is also not performed as shown in the view 110.

Also, general lane detection technology heretofore available detects a lane colored with, for example, white, yellow, orange, or blue from a 2D image captured by a camera and thus, does not generate a 3D road model. In terms of the 2D map not having height information, a ramp is not indicated when it is directly applied to a modeling. Also, due to a limitation of current lane detection technology, it is not possible to generate a road model in a long distance of 100 m or farther. Thus, as shown in the view 130, it is difficult to generate a road model in a relatively long distance converging to a vanishing point in a camera image.

An apparatus, according to an embodiment, for generating a 3D road model generates a dominant plane indicating plane information of a road based on a lane detection result and depth information and generates a 3D short-distance road model. Hereinafter, the apparatus for generating a 3D road model is also referred to as a generation apparatus. Also, the generation apparatus extracts road shape information from map information, matches the road shape information and 3D short-distance road model, projects a result of the matching to the dominant plane, and generates a 3D long-distance road model that is beyond a lane detection range. In this disclosure, "map information" is understood as information indicating topography, land use, water, roads, railroads, buildings, and settlements, such as various types of ground surface and objects on the ground to be shown on the map. The map information includes, for example, address information, GPS coordinates, 3D information indicating x, y, and z coordinates, and 2D information indicating a latitude and longitude of objects on the ground and various forms of land shown on the map as well as road shape information including 2D information indicating a latitude and a longitude of a road surface, a lane marking on the road, or a center line of the road. In addition, "map information" includes a variety of information provided through a vehicular navigation system. A method of generating the 3D short-distance road model and the 3D long-distance road model using the generation apparatus will be described with reference to FIGS. 2 through 9. From the map information, the generation apparatus is configured to acquire a route along which a vehicle is to be driven based on road shape information or GPS coordinates from a point of departure to a destination, or acquire a current location of the vehicle or a driving direction of the vehicle. In addition, the generation apparatus is configured to extract road shape information corresponding to a driving route of the vehicle from the map information and generate a road model. In this disclosure, "lane-detection range" is understood as a range or distance of about 100 meters (m) approaching a vanishing point in a camera image, and "long-distance road model" is understood as a road model in a distance or an area exceeding such lane-detection range, for example, 100 m. Also, "extrinsic parameter" of the camera is a term generalized in association with a camera calibration and corresponds to, for example, a parameter representing movement, rotation, and seize conversion in the camera such as a 3D location and 3D posture information such as pan, tilt, pitch, yaw, and roll of the camera. Additionally, such "extrinsic parameter" of the camera may correspond to, for example, a relationship between the camera and a photographed surface such as a focal length and principal point distortion coefficient.

FIG. 2 illustrates an example of a method of generating a 3D road model. Referring to FIG. 2, in operation 210, a generation apparatus calculates a free space indicating a driving-allowed area of a vehicle based on a driving image captured from the vehicle during driving. For example, the generation apparatus segments the driving image and calculates the free space from the driving image segmented through machine learning. Also, the generation apparatus calculates the free space based on a depth map corresponding to a front of the vehicle and the driving image. The free space is, for example, an area as further discussed with reference to operation 730 of FIG. 7.

A method of calculating the free space using the generation apparatus based on the driving image and the depth map will be described with reference to FIG. 3.

In operation 220, the generation apparatus generates a dominant plane indicating plane information of a road based on at least one of depth information included in the free space or the depth map corresponding to the front of the vehicle. The dominant plane is obtained from a depth measurement value of the driving image or a depth value in the depth map. The dominant plane may be a 3D plane or a 3D curved surface that represents a surface of the road as further discussed with reference to operation 740 of FIG. 7.

In operation 230, the generation apparatus generates a 3D short-distance road model based on the dominant plane. A method of generating the 3D short-distance road model using the generation apparatus will be described with reference to FIG. 4.

Figure 3:
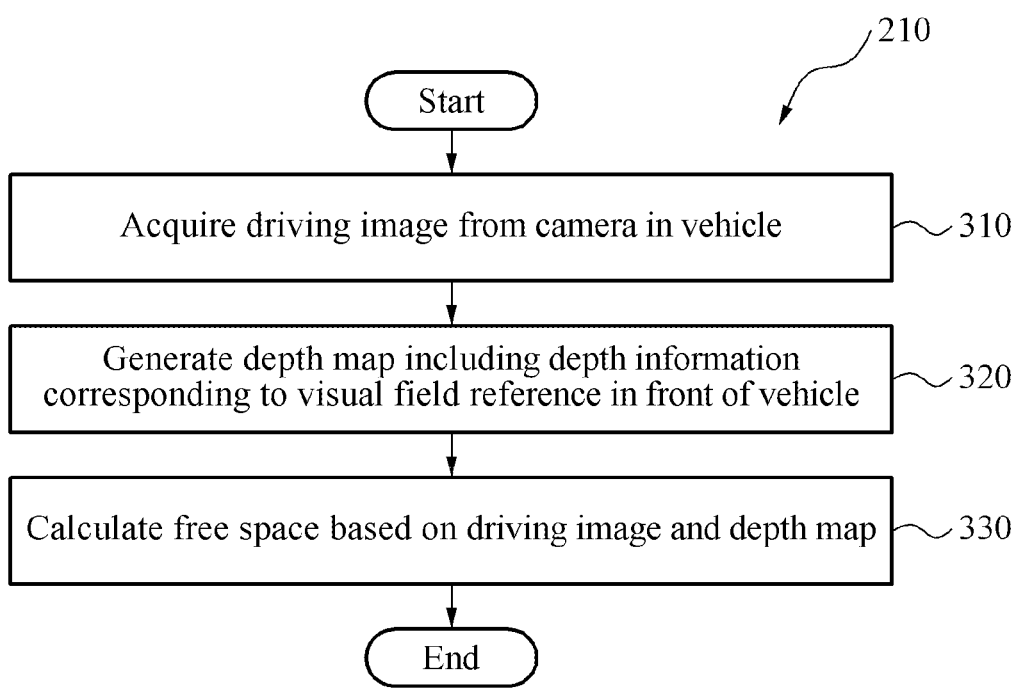
FIG. 3 illustrates an example of a method of calculating a free space.

FIG. 3 illustrates an example of a method of calculating a free space. Referring to FIG. 3, in operation 310, a generation apparatus acquires a driving image using a camera in a vehicle. The driving image includes, for example, camera information, a black-and-white image, and a color image captured by the camera in the vehicle during driving. The camera information includes, for example, an intrinsic parameter and an extrinsic parameter of the camera.

In operation 320, the generation apparatus generates a depth map including depth information corresponding to a visual field reference in front of the vehicle. The generation apparatus acquires the depth information using at least one of, for example, a radar, a lidar, an ultrasonic acoustic sonar, and a stereo matching method using a stereo camera. The radar detects an object and measures a distance using a radio wave. The lidar radiates a laser beam and measures a temperature, a humidity, and a visibility in the atmosphere based on reflection and absorption thereof. Also, the generation apparatus acquires the depth information using the stereo matching method using the stereo camera and generates the depth map based on the depth information. The depth information includes, for example, a depth value.

In operation 330, the generation apparatus calculates the free space based on the driving image and the depth map.

Figure 4:
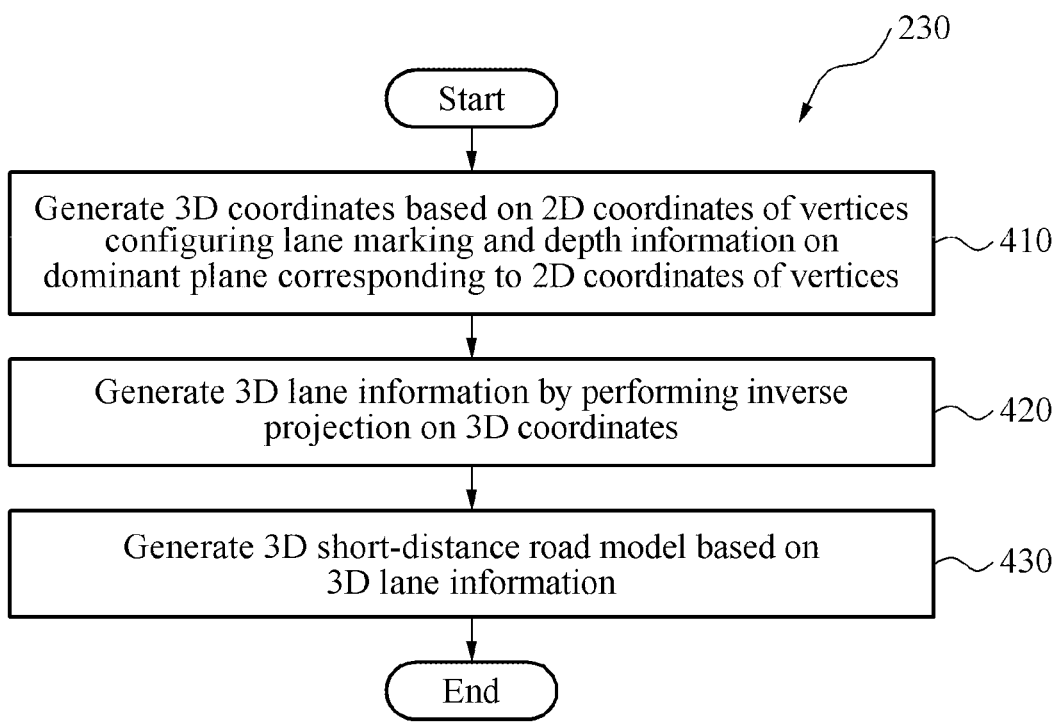
FIG. 4 illustrates an example of a method of generating a 3D short-distance road model.

FIG. 4 illustrates an example of a method of generating a 3D short-distance road model. Referring to FIG. 4, in operation 410, a generation apparatus generates 3D coordinates based on 2D coordinates of vertices configuring a lane marking and depth information on a dominant plane corresponding to the 2D coordinates of the vertices. The generation apparatus calculates 2D lane control vertex (CV) coordinates of vertices configuring a lane marking colored with white, yellow, orange, red, and/or blue in a short distance, that is, coordinates of vertices on a 2D lane. The colors of interest, according to one or more embodiments, are selectively set according to legal jurisdiction. For example, the specific colors to be evaluated in the image may change based upon country e.g. Korea, United States, and the like as will be apparent to one of skill in the art after gaining a thorough understanding of the detailed description. The generation apparatus acquires depth information, for example, z information on the dominant plane corresponding to the 2D lane coordinates, from the depth map corresponding to the front of the vehicle and generates the 3D coordinates.

In operation 420, the generation apparatus generates 3D lane information by performing an inverse projection on the 3D coordinates generated in operation 410. The generation apparatus generates the 3D lane information including, for example, a 3D lane marking and a 3D center line.

In operation 430, the generation apparatus generates a 3D short-distance road model based on the 3D lane information.

Figure 5:
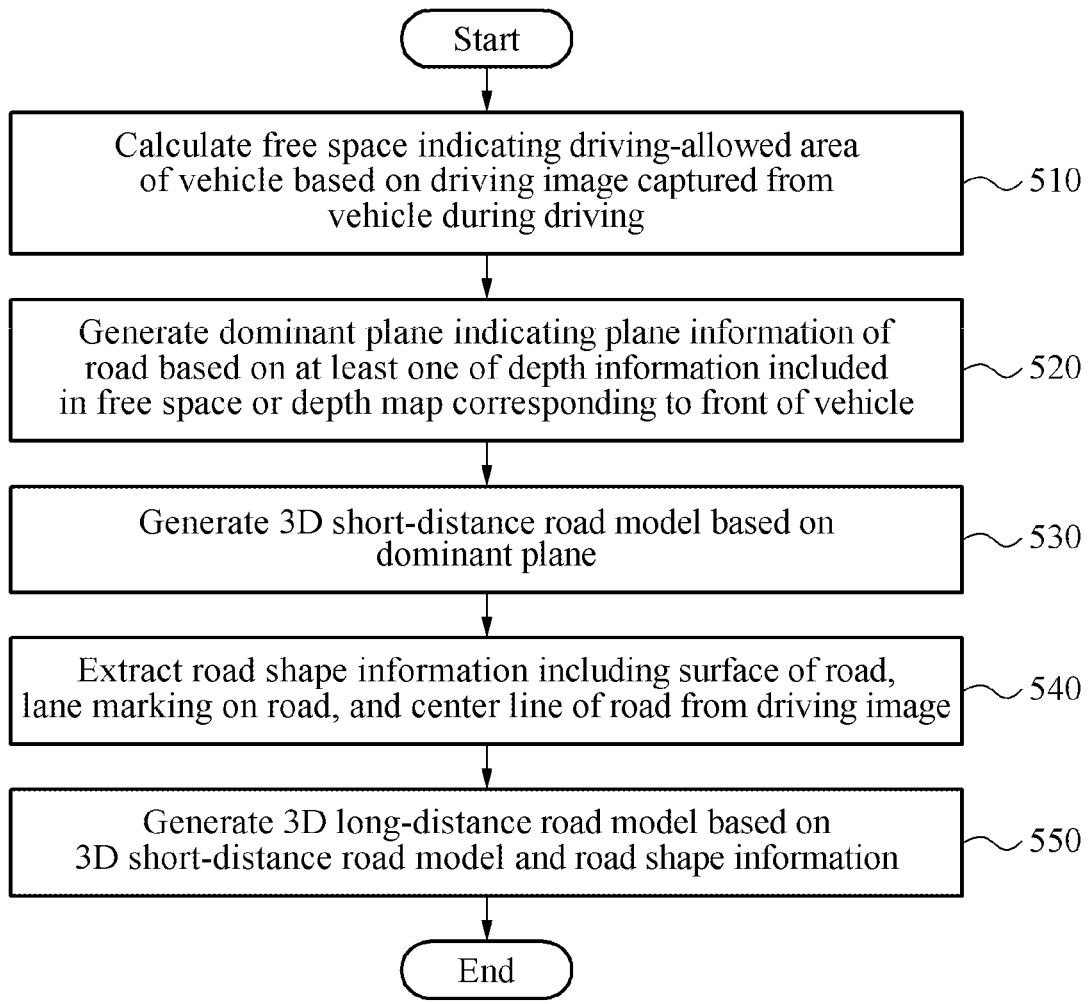
FIG. 5 illustrates an example of a method of generating a 3D long-distance road model.

FIG. 5 illustrates an example of a method of generating a 3D long-distance road model. Because the descriptions of operations 210 through 230 of FIG. 2 are applicable here, repeated descriptions of operations 510 through 530 of FIG. 5 will be omitted for clarity and conciseness.

In operation 540, a generation apparatus extracts road shape information including, for example, a surface of a road, a lane marking on the road, and a center line of the road from a driving image. A method in which the generation apparatus extracts road shape information is as follows.

The generation apparatus acquires location information including at least one of current location information of a vehicle or direction information of the vehicle. The generation apparatus acquires the location information using at least one of, for example: a global positioning system (GPS), an inertial measurement unit (IMU), or a visual odometry. Also, the generation apparatus acquires travel route information based on a starting point and a destination from map information. The generation apparatus acquires the location information including at least one of the current location information of the vehicle or the direction information of the vehicle based on the travel route information.

The generation apparatus extracts road shape information currently viewed by a camera based on the location information acquired in operation 540 and camera information included in the driving image. The generation apparatus extracts road shape information entering a viewing frustum of the camera from the map information based on the location information and the camera information included in the driving image.

The road shape information is, for example, 2D information represented by a latitude and a longitude, or 3D information represented by predetermined components x, y, and z. The road shape information is, for example, white, yellow, and blue lane marking information, a road center line crossing a center on each lane, or road surface information.

In operation 550, the generation apparatus generates a 3D long-distance road model based on the 3D short-distance road model generated in operation 530 and the road shape information extracted in operation 540.

In operation 550, the generation apparatus matches the road shape information and the 3D short-distance road model. The generation apparatus matches the road shape information and the 3D short-distance road model based on, for example, a least square method (LSM). The generation apparatus projects a matching result to the dominant plane generated in operation 520 and generates the 3D long-distance road model.

In operation 550, the generation apparatus acquires height information from the dominant plane, and generates the 3D long-distance road model based on the height information, the road shape information and the 3D short-distance road model. In this example, since a 2D map does not have the height information, the generation apparatus projects 2D coordinates obtained from the 2D map to the dominant plane and acquires the height information.

Figure 6:
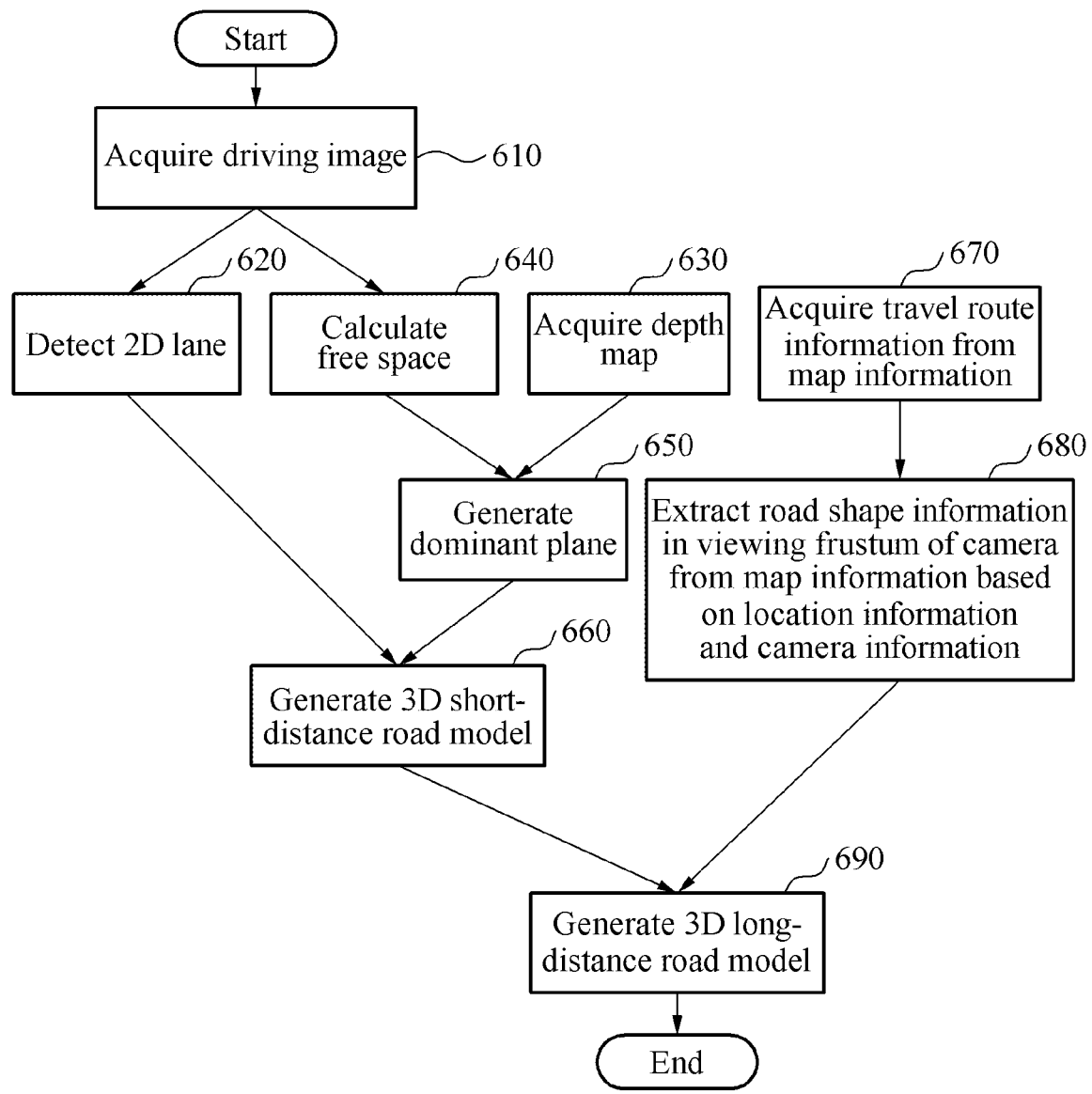
FIG. 6 illustrates an example of generating a 3D road model.

FIG. 6 illustrates an example of generating a 3D road model. Referring to FIG. 6, in operation 610, a generation apparatus acquires a driving image using a capturing device, for example, a vision sensor and a camera, included in the vehicle during driving. The driving image includes, for example, a color image, a black-and-white image, and camera information.

In operation 620, the generation apparatus detects a 2D lane or a 2D lane marking from the driving image acquired in operation 610. The 2D lane detected in operation 620 may be detected in a form of x and y coordinates in a short-distance area of a road. In operation 620, the generation apparatus extracts road shape information including a surface of a road and a center line of the road from the driving image in addition to a lane marking on the road.

In operation 630, the generation apparatus acquires a depth map corresponding to a front of a vehicle using any one or any combination of a stereo camera, an ultrasonic sensor, a lidar, and a radar. The depth map is based on, for example, a visual field in an AR system.

In operation 640, the generation apparatus calculates a free space indicating a driving-allowed area of the vehicle from the driving image acquired in operation 610 through, for example, machine learning.

In operation 650, the generation apparatus calculates and generates a dominant plane indicating plane information of the road using at least one of the depth map generated in operation 630 and depth information included in the free space calculated in operation 640. The dominant plane is obtained, for example, from a depth measurement value of the driving image and may be a plane or a curved surface representing a shape of the surface of the road.

The generation apparatus generates 3D coordinates based on 2D coordinates of vertices configuring a lane marking and depth information on the dominant plane corresponding to the 2D coordinates of the vertices. In operation 660, the generation apparatus generates a 3D short-distance road model based on 3D lane information generated by performing an inverse projection on the 3D coordinates. In this example, the 3D short-distance road model may be generated in a lane detection limit distance.

In operation 670, the generation apparatus acquires travel route information based on a starting point and a destination of the vehicle from map information. In this example, the generation apparatus acquires location information including at least one of current location information of the vehicle or direction information of the vehicle based on the travel route information.

In operation 680, the generation apparatus extracts road shape information entering a viewing frustum of the camera from the map information or a travel route included in the map information based on the current location information and the direction information acquired in operation 670.

In operation 690, the generation apparatus generates a 3D long-distance road model by expanding the 3D short-distance road model generated in operation 660 to a long distance using the road shape information extracted in operation 680.

FIG. 7 illustrates an example of generating a 3D road model. Referring to FIG. 7, in operation 710, a generation apparatus detects a 2D lane or a 2D lane marking from a driving image acquired by a camera in a vehicle during driving. In this example, the 2D lane is detected in a form of 2D coordinates, for example, (x, y) of vertices configuring a lane marking of a short-distance area on a road.

In operation 720, the generation apparatus generates a depth map corresponding to a front of the vehicle. The generation apparatus generates the depth map based on a measurement value obtained using a radar or a lidar, or a depth value obtained using a stereo camera.

In operation 730, the generation apparatus calculates a free space indicating a driving-allowed area of the vehicle from the driving image captured from the vehicle during the driving. Depending on examples, the generation apparatus calculates the free space based on the driving image and the depth map.

In operation 740, the generation apparatus generates a dominant plane indicating plane information of a road based on at least one of a depth map or depth information included in the free space.

In operation 750, the generation apparatus generates 3D lane information by performing an inverse projection on 2D coordinates of vertices, for example, coordinates of the 2D lane detected in operation 710 and depth information of the dominant plane corresponding to the 2D coordinates. The depth information of the dominant plane corresponding to the 2D coordinates may be a z coordinate generated based on 2D lane CV coordinates.

In operation 760, the generation apparatus generates a 3D short-distance road model based on the 3D lane information.

In operation 770, the generation apparatus extracts road shape information and performs matching based on current direction information, current location information acquired through a GPS, and camera information included in the driving image. The generation apparatus extracts the road shape information including a lane and a center line entering a viewing frustum of the camera from the map information or a travel route of the map information. Also, the generation apparatus matches a road shape in a long distance and lane height information provided from the 3D dominant plane generated in operation 740, and generates long-distance lane shape information.

In operation 780, the generation apparatus expands the 3D short-distance road model generated in operation 760 to a long distance based on the road shape information extracted in operation 770 and generates a 3D long-distance road model that is robust to depth noise.

FIG. 8 illustrates an apparatus for generating a 3D road model. Referring to FIG. 8, an apparatus 800 for generating a 3D road model includes a camera 810, a processor 820, a memory 830, and a communication interface 840. The camera 810, the processor 820, the memory 830, and the communication interface 840 are connected with one another through a communication bus 805.

The camera 810 captures a driving image from a vehicle during driving. It is understood that the camera 810 includes, for example, a complementary metal-oxide-semiconductor (CMOS) image sensor (CIS) camera, an infrared camera, a vision sensor, and other various capturing devices.

The processor 820 calculates a free space indicating a driving-allowed area of the vehicle based on a depth map corresponding to a front of the vehicle and the driving image captured by the camera 810. The processor 820 acquires the driving image using the camera 810, and generates a depth map including depth information corresponding to a visual field reference in front of the vehicle. The processor 820 calculates the free space based on the driving image. The processor 820 also calculates the free space based on the driving image and the depth map.

The processor 820 generates a 3D short-distance road model based on a dominant plane indicating plane information of a road generated using at least one of the depth map or the depth information included in the free space. The processor 820 extracts road shape information including a surface of the road, a lane marking on the road, and a center line of the road from the driving image. The processor 820 generates 3D coordinates based on 2D coordinates of vertices configuring the lane marking and depth information on the dominant plane corresponding to the 2D coordinates of the vertices. The processor 820 generates 3D lane information by performing an inverse projection on the generated 3D coordinates and generates the 3D short-distance road model based on the 3D lane information.

The memory 830 stores map information. The map information is stored in the memory 830 in a form of, for example, a map database. The memory 830 also stores the road shape information extracted by the processor 820 and the short-distance road model generated by the processor 820.

The processor 820 extracts travel route information based on a starting point and a destination of the vehicle from the map information stored in the memory 830. The processor 820 acquires location information including at least one of current location information of the vehicle or direction information of the vehicle based on the extracted travel route information. The processor 820 extracts road shape information entering a viewing frustum of the camera 810 from the map information based on the location information and camera information included in the driving image.

The processor 820 matches the road shape information to the 3D short-distance road model, projects a matching result to the dominant plane, and generates the 3D long-distance road model.

The communication interface 840 transmits the 3D short-distance road model and the 3D long-distance road model generated by the processor 820 and the map information to an outside of the generation apparatus. The communication interface 840 receives the map information and other various pieces of information. The information received through the communication interface 840 is stored in the memory 830.

The memory 830 stores various pieces of information generated in the aforementioned operations of the processor 820. The memory 830 also stores various types of data and programs. The memory 830 includes a volatile memory or a non-volatile memory. The memory 830 includes a high-capacity storage medium such as a hard disk to store various data. For example, the memory 830 stores map data using at least one hard disk.

FIG. 9 illustrates an example of a processor in an apparatus for generating a 3D lane model. Referring to FIG. 9, a processor 900 of a generation apparatus includes an information acquirer 910, a lane detector 920, a dominant plane generator 930, a road shape information extractor 940, and a 3D road model generator 950.

The information acquirer 910 acquires a color or black-and-white driving image input from a camera in a vehicle during driving. Also, the information acquirer 910 acquires camera information such as an intrinsic parameter and an extrinsic parameter of the camera.

The information acquirer 910 acquires a depth value of a front of the vehicle during the driving. The information acquirer 910 calculates the depth value of the front of the vehicle based on various methods, for example, a stereo matching method and a radar or lidar-based method and acquires a depth map based on the depth value. Also, the information acquirer 910 acquires location information and direction information of the vehicle during the driving.

The lane detector 920 extracts a surface of a road and a 2D lane from the driving image acquired in the information acquirer 910.

The dominant plane generator 930 includes a free space calculator 933 and a dominant plane calculator 936. The free space calculator 933 calculates a free space indicating a driving-allowed area of the vehicle using the driving image acquired in the information acquirer 910, or the driving image and the depth map. The dominant plane calculator 936 calculates a dominant plane of the road based on at least one of the depth map or the free space.

The road shape information extractor 940 extracts road shape information currently viewed by the camera from a map information processor 945 based on the location information and the direction information of the vehicle, and the camera information acquired in the information acquirer 910.

The 3D road model generator 950 includes a short-distance road model generator 953 and a long-distance road model generator 956.

The short-distance road model generator 953 performs an inverse projection using 2D lane CV coordinates detected by the lane detector 920 and a depth value corresponding to the 2D lane CV coordinates on the dominant plane calculated by the dominant plane calculator 936. The short-distance road model generator 953 generates a 3D short-distance road model based on a result of the inverse projection. The 3D short-distance road model includes, for example, a 3D lane marking and a center line of a lane.

The long-distance road model generator 956 expands the 3D short-distance road model generated by the short-distance road model generator 953 to a long distance and generates a 3D long-distance road model. In this example, the 3D long-distance road model is generated based on the road shape information generated by the road shape information extractor 940. Height information that is not included in 2D map information is generated by projecting the road shape information to the dominant plane.

The apparatuses, units, modules, devices, and other components described herein, such as processor 900, information acquirer 910, lane detector 920, dominant plane generator 930, road shape information extractor 940, and 3D road model generator 950 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a three-dimensional (3D) lane model, the method comprising:
    calculating a free space indicating a driving-allowed area based on a driving image captured from a camera of a vehicle;
    generating a dominant plane indicating plane information of a road based on a depth information of the free space;
    generating road shape information of the road based on travel route information of the vehicle acquired from map information;
    generating a 3D short-distance road model based on the dominant plane; and
    generating, by matching the generated 3D short-distance road model to the travel route information and by expanding the 3D short-distance road model based on the road shape information, a 3D long-distance road model to indicate a second area of the road further from the vehicle than a first area of the road in front of the vehicle,
    wherein the 3D short-distance road model indicates the first area of a road.

2. The method of claim 1, wherein the calculating of the free space comprises:
    acquiring the driving image from the camera included in the vehicle;
    generating a depth map including depth information corresponding to a visual field criterion of the front of the vehicle; and
    calculating the free space based on the driving image and the depth map.

3. The method of claim 2, wherein the driving image includes any one or any combination of any two or more of camera information, a black-and-white image, and a color image captured by the camera.

4. The method of claim 2, wherein the generating of the depth map comprises acquiring the depth information using any one or any combination of any two or more of a radar, a lidar, and a stereo matching method using a stereo camera.

5. The method of claim 1, wherein the generating of the road shape information further comprises:
    extracting the road shape information from the driving image, the road shape information including any one or any combination of any two or more of a surface of the road, a lane marking on the road, and a center line of the road.

6. The method of claim 5, wherein the generating of the 3D short-distance road model comprises:
    generating 3D coordinates based on two-dimensional (2D) coordinates of vertices configuring the lane marking and depth information corresponding to the 2D coordinates of the vertices on the dominant plane;
    generating 3D lane information by performing inverse projection on the generated 3D coordinates; and
    generating the 3D short-distance road model based on the 3D lane information.

7. The method of claim 5, wherein the extracting of the road shape information comprises:
    acquiring location information including either one or both of current location information of the vehicle and direction information of the vehicle; and
    extracting the road shape information currently viewed by the camera based on the location information and camera information included in the driving image.

8. The method of claim 7, wherein the acquiring of the location information comprises acquiring the location information using any one or any combination of any two or more of a global positioning system (GPS), an inertial measurement unit (IMU), and a visual odometry method.

9. The method of claim 7, wherein the acquiring of the location information comprises:
    acquiring the travel route information based on a starting point and a destination of the vehicle from the map information; and
    acquiring the location information including either one or both of the current location information of the vehicle and the direction information of the vehicle, based on the travel route information.

10. The method of claim 9, wherein the extracting of the road shape information comprises extracting the road shape information entering a viewing frustum of the camera from the map information based on the location information and the camera information included in the driving image.

11. The method of claim 10, further comprising:
    generating the 3D long-distance road model based on the road shape information and the 3D short-distance road model.

12. The method of claim 11, wherein the generating of the 3D long-distance road model comprises:
    matching the road shape information and the 3D short-distance road model; and
    projecting a result of the matching onto the dominant plane for generating the 3D long-distance road model.

13. The method of claim 12, wherein the matching comprises matching the road shape information and the 3D short-distance road model using a least square method (LSM).

14. The method of claim 11, wherein the generating of the 3D long-distance road model comprises:
    acquiring height information from the dominant plane; and
    generating the 3D long-distance road model based on the height information, the road shape information, and the 3D short-distance road model.

15. A non-transitory computer-readable storage medium storing instructions that, when executed by one or more processors, cause the one or more processors to perform the method of claim 1.

16. An apparatus for generating a three-dimensional (3D) road model, the apparatus comprising:
a camera configured to capture a driving image from a vehicle; and
one or more processors configured to:
calculate a free space indicating a driving-allowed area based on the driving image,
generate a dominant plane indicating plane information of a road based on a depth information of the free space,
generate road shape information of the road based on travel route information of the vehicle acquired from map information,
generate a 3D short-distance road model based on the dominant plane, and
generating, by matching the generated 3D short-distance road model to the travel route information and by expanding the 3D short-distance road model based on the road shape information, a 3D long-distance road model to indicate a second area of the road further from the vehicle than a first area of the road in front of the vehicle,
wherein the 3D short-distance road model indicates the first area of a road.

17. The apparatus of claim 16, wherein the one or more processors are further configured to acquire the driving image from a camera included in the vehicle, generate a depth map including depth information corresponding to a visual field criterion of the front of the vehicle, and calculate the free space based on the driving image and the depth map.

18. An apparatus for generating a three-dimensional (3D) road model, the apparatus comprising:
a camera configured to capture a driving image from a vehicle; and
one or more processors configured to:
calculate a free space indicating a driving-allowed area based on the driving image,
generate a dominant plane indicating plane information of a road based on a depth information of the free space,
generate a 3D short-distance road model based on the dominant plane, and
generating a 3D long-distance road model by matching the generated 3D short-distance road model to map-based travel route information, wherein the one or more processors are further configured to:
extract road shape information including any one or any combination of any two or more of a surface of the road, a lane marking on the road, and a center line of the road from the driving image,
generate 3D coordinates based on two-dimensional (2D) coordinates of vertices configuring the lane marking and depth information corresponding to the 2D coordinates of the vertices on the dominant plane, and
generate the 3D short-distance road model based on 3D lane information generated by performing inverse projection on the generated 3D coordinates.

19. The apparatus of claim 18, further comprising:
a memory configured to store map information, and
wherein the one or more processors are configured to acquire location information including either one or both of current location information of the vehicle or direction information of the vehicle based on the travel route information generated using a starting point and a destination of the vehicle from the map information stored in the memory, and extract road shape information entering a viewing frustum of the camera from the map information based on the location information and the camera information included in the driving image.

20. The apparatus of claim 19, wherein the one or more processors are configured to match the road shape information and the 3D short-distance road model and project a result of the matching onto the dominant plane for generating the 3D long-distance road model.

21. The method of claim 1, wherein the generating of the dominant plane comprises generating the dominant plane based on a depth map corresponding to a front of the vehicle.

* * * * *